United States Patent [19]

Koehn

[11] 3,751,650

[45] Aug. 7, 1973

[54] VARIABLE LENGTH ARITHMETIC UNIT

[75] Inventor: William A. Koehn, Santa Barbara, Calif.

[73] Assignee: Burroughs Corporation, Detroit, Mich.

[22] Filed: June 28, 1971

[21] Appl. No.: 157,091

[52] U.S. Cl. ................................ 235/175, 235/168
[51] Int. Cl. ........................................ G06f 7/385
[58] Field of Search .................... 235/168, 169, 173, 235/174, 175

[56] References Cited

UNITED STATES PATENTS

| | | | |
|---|---|---|---|
| 3,683,163 | 8/1972 | Hanslip | 235/173 |
| 3,440,412 | 4/1969 | Kardash | 235/175 |
| 3,566,098 | 2/1971 | Kono | 235/175 |
| 3,465,133 | 9/1969 | Booher | 235/175 |
| 3,535,502 | 10/1970 | Clapper | 235/175 X |
| 2,981,471 | 4/1961 | Bachus | 235/175 |

*Primary Examiner*—James F. Gottman
*Attorney*—Christie, Parker & Hall

[57] ABSTRACT

An arithmetic unit in which a plurality of arithmetic and logic functions are performed using either one or both of two inputs X and Y, each input providing a variable number of bits in parallel. The output may be any one of a number of functions, such as the arithmetic functions of X + Y and X − Y, and the logical functions X·Y, X + Y, X⊕Y, $\overline{X}$, and $\overline{Y}$, etc. All of the functions are generated by the unit and any of the functions may be selected and operate as a data source. The arithmetic unit can operate either in a straight binary or a binary-coded decimal mode. The number of bits in the output for the arithmetic functions is variable and the carry or borrow is generated for each order and is therefore available from the highest order according to the selected length.

5 Claims, 5 Drawing Figures

INVENTOR.
WILLIAM A. KOEHN

BY
Christie, Parker & Hale
ATTORNEYS

VARIABLE LENGTH ARITHMETIC UNIT

FIELD OF THE INVENTION

This invention relates to digital processors, and more particularly, is concerned with a function generating circuit for variable length inputs and outputs.

BACKGROUND OF THE INVENTION

In copending application Ser. No. 157,297, filed June 28, 1971, in the name of Roger E. Packard and assigned to the same assignee as the present application, there is described a microprogram processor which is designed to operate on variable width words. The processor utilizes a free field memory which permits addressing of operands of any length starting at any bit location for transfer into and out of memory. While the transfer paths within the processor are a fixed width, i.e., can transfer a fixed maximum number of bits in parallel, words of less than the maximum number of bits can be utilized in any single transfer operation under the control of a Bias register. Where operand words greater than the fixed width of the transfer path of the processor are required, multiple transfers are automatically provided with the last transfer having a width corresponding to the difference between the required word length and an integral multiple of the maximum number of bits per transfer.

The processor described in the above-identified copending application permits maximum flexibility in the format of the machine instructions and the operands, since operation of the processor is not tied to specific word lengths and microprogramming permits complete flexibility in programming.

SUMMARY OF THE INVENTION

In particular, the present invention is directed to an improved arithmetic unit particularly suited for use in a processor of the type described in the above-identified copending application. The arithmetic unit functions as a sink for an X operand and a Y operand over a data transfer bus. The arithmetic unit acts as a multiple source for operands coupled to the data bus, each source providing a different function of one or both input operands X and Y. Control information is derived from a microoperator which specifies which of the sources is coupled to the data bus. In addition, control information stored in a Bias register specifies, first, the length of the operand, in terms of the number of parallel bits coupled to the data bus; second, the unit designation as to whether the output is straight binary, a binary-coded decimal 4-bit code, or binary-coded decimal 8-bit code; and, third, whether a carry is present. In response to the control information, the arithmetic unit operates as a source for any one of a plurality of functions, such as a binary sum, a binary difference, a binary-coded decimal sum or difference, and various other logical and operational functions. The arithmetic unit can act as a source of straight binary, binary-coded decimal 4-bit code, or binary-coded decimal 8-bit code for whatever width of output word is specified. The arithmetic unit will generate Carry information for whatever width of word is specified.

BRIEF DESCRIPTION OF THE DRAWINGS

For a better understanding of the invention reference should be made to the accompanying drawings, wherein.

DETAILED DESCRIPTION

Figure 3:
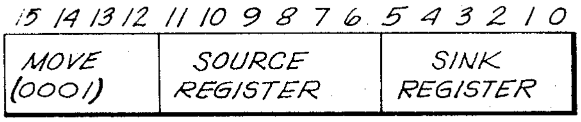
FIG. 3 shows the format of a microoperator.

The arithmetic unit operates as both a source and a sink for data transferred over a common data bus, which by way of example, is shown as consisting of 24 separate lines for transferring in parallel up to 24 binary bits. Transfer of words into the arithmetic unit as a sink or from the arithmetic unit as a source is under the control of a microoperator stored in an M-register 30 and applied to a control bus consisting of, for example, 16 parallel lines each set to one of two levels by 16 bits stored in the M-register 30. The format of the microoperator stored in the M-register 30 for utilizing the arithmetic unit as a source or a sink is shown in FIG. 3. This microoperator, referred to as the Move operator, is specified by a .001 in the four most significant bit positions, for example. The next six bits, numbered 6 through 11, specify the source register from which a word is gated onto the data bus and the remaining six bits, numbered 0 through 5, specify the sink register to which a word transferred over the data bus is to be stored.

Figure 1:
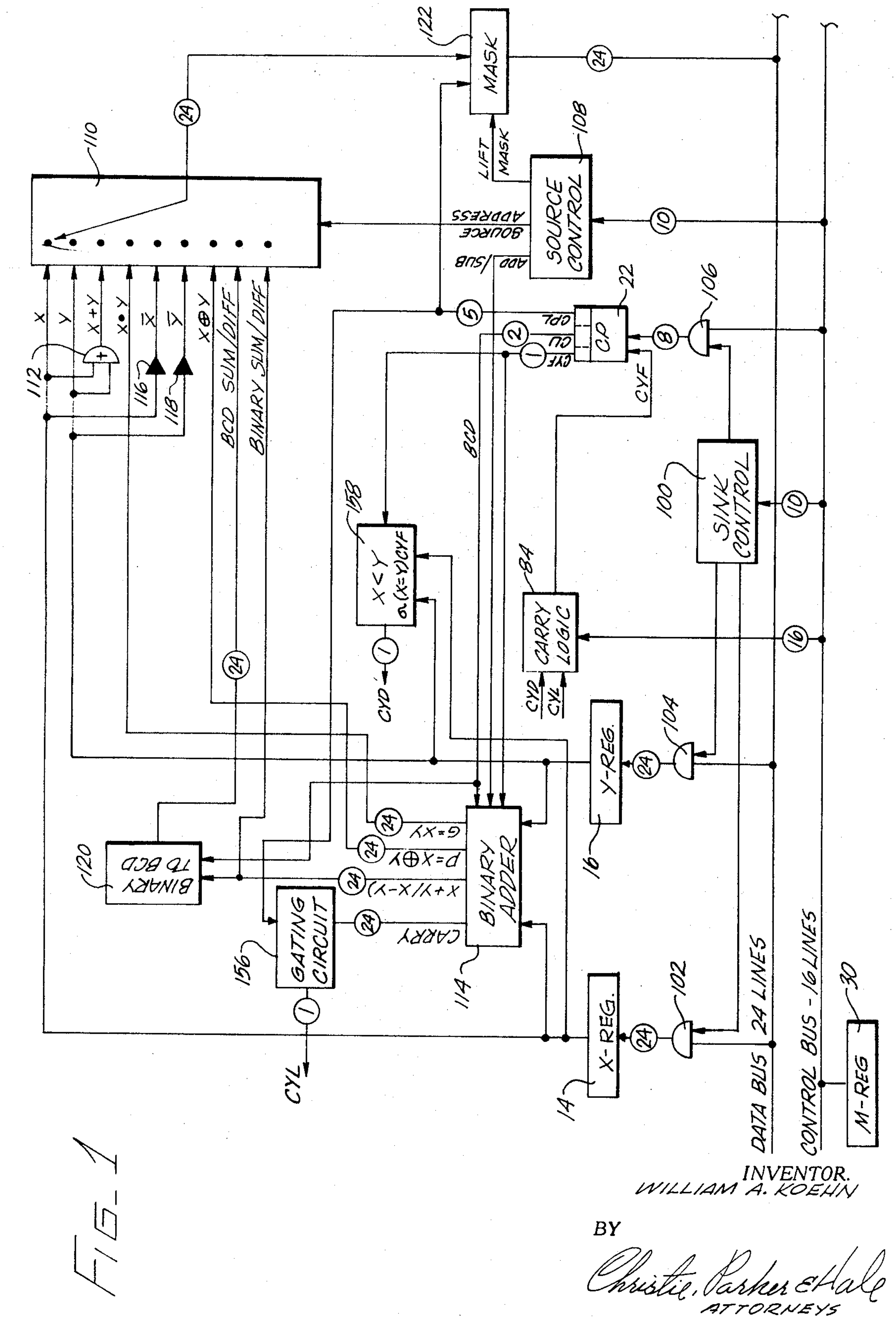
FIG. 1 is a block diagram of the arithmetic unit and associated registers and control circuitry.

Referring again to the arithmetic unit of FIG. 1, there are three registers which can be specified as a sink register in connection with the arithmetic unit. An X-register 14 normally stores one operand received over the data bus from some specified source (not shown) such as the output of the memory unit or some other register connected to the data bus. A second sink is a Y-register 16 which stores the second operand involved in any arithmetic operation. Both the X-register and Y-register store up to 24 bits, corresponding to the full width of the transfer path provided by the data bus. Finally, a bias control register 22, referred to as the CP-register, is associated with the arithmetic unit, although it has other functions, as described in the above-mentioned copending application. This register stores 8 bits and is divided into three fields designated respectively CPL, which is 5 bits in length, CPU, which is 2 bits in length, and CYF, which is 1 bit in length. The CPL field is coded to specify any field length from 0 to 24 bits, corresponding to the required word length involved in any transfer operation over the data bus. The CPU field designates whether the word being transferred is coded in straight binary, in 4-bit binary-coded decimal or in 8-bit binary-coded decimal. The CYF field specifies whether or not a Carry input is present.

Transfer of words from the data bus into the X-register 14, the Y-register 16, and the CP-register 22 is controlled by a sink control circuit 100. The sink control circuit 100 responds to the 4 bits specifying that a Move operation is required and to the 6 bits from the M-register on the control bus specifying the particular sink register. In decoding the sink register bits, the sink control selects one of three gating circuts 102, 104, or 106 for coupling the data bus respectively to the input to the X-register 14, the Y-register 16, or the CP-register 22. The source (not shown) may be any register or memory which puts data on the data bus.

The Move microoperator is also used to transfer a word out of the arithmetic unit as a source. To this end, the 6 bits designating the source register and the 4 bits specifying that a Move operation is to take place are applied to a source control circuit 108. The source control circuit 108 decodes the source register portion of the microoperator to connect, by means of a switching circuit 110, any one of a plurality of functions generated within the arithmetic and logic network to the data bus. The switching circuit 110, in response to the source address information derived from the source control 108, may selectively couple the 24 bits from the X-register to the output of the gating circuit or the 24 bits of the Y-register to the output of the gating circuit. Other functions applied to the input of the switching circuit 110 are the X OR Y logic function, the X AND Y logic function, the complement of X, the complement of Y, the X Exclusive Or Y function, the binary sum or difference, the 4-bit binary-coded decimal sum or difference, or the 8-bit binary-coded decimal sum or difference.

The X OR Y function is derived from a logical OR circuit 112 to which the output of the X-register 14 and Y-register 16 are ORed together. The X AND Y function is derived from a binary adder circuit 114 in the manner described in more detail in connection with FIG. 2. The complement of X and Y are derived through inverters 116 and 118 coupled to the output of the X-register and Y-register, respectively. The X Exclusive Or Y function is also derived from the binary adder 114 in the manner described below in connection with FIG. 2. The binary sum/difference is derived from the binary adder circuit 114. The source control 108 provides a signal to the binary adder 114 which determines whether the output is the sum or the difference, depending upon the coding of the source register portion of the Move operator in the M-register 30. The binary-coded decimal sum/difference functions are derived from a binary to binary-coded decimal converter circuit 120, described in more detail below in connection with FIG. 5.

The function result selected by the switching circuit 110 is applied to a masking circuit 122. Many of the functions require all 24 bits to be gated from the source to the data bus. The source control 108 recognizes those functions selected by the coding of the source register portion of the Move microoperator and provides a Lift Mask signal to the mask circuit 122, which causes all 24 lines from the switching circuit 110 to be applied to the lines of the data bus. For those functions in which less than a full 24-bit word is to be applied to the data bus, the mask 122 is controlled by the CPL section of the CP-register 22. CPL, as pointed out above, is set to specify any number of bits from 1 to 24 and operates to select the corresponding number of lines, starting with the least significant bit line, for connection from the output of the switching circuit 110 to the data bus.

Figure 4:
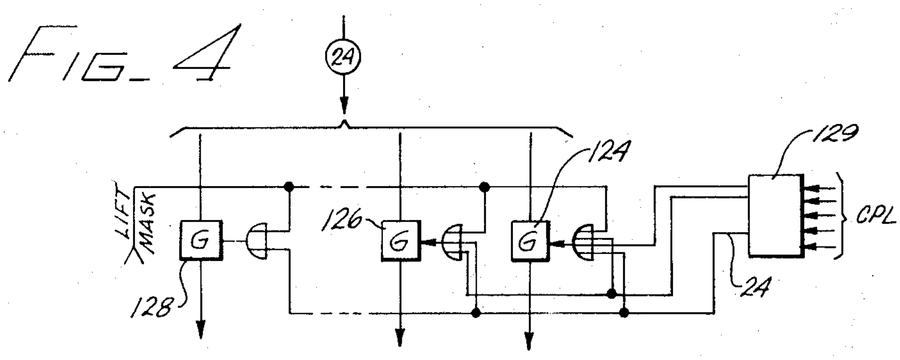
FIG. 4 is a schematic diagram of a masking circuit.

The masking circuit 122 is shown in more detail in FIG. 4. It includes a gate for each of the 24 lines from the switching circuit 110. Only three of the 24 lines with their associated gates 124, 126, and 128 are shown in FIG. 4. Gate 124 corresponds to the least significant bit and gate 128 corresponds to the most significant bit. The Lift Mask signal is applied to each of the gates, so that when the Lift Mask signal is true, all of the gates are open. The output of the CPL section of the CP-register 22 is applied to a decoder 129 which activates one of 24 output lines. The first output line is applied to the gate 124 so as to gate only the least significant bit to the data bus. The second output of the decoder 129 is applied to both the gate 124 and the gate 126 so as to apply the first two least significant bits to the data bus. Output 24 from the decoder 129 is applied to all of the gates if 24 bits are specified by CPL. Thus the coded value of CPL determines the number of bits applied to the data bus.

Figure 2:
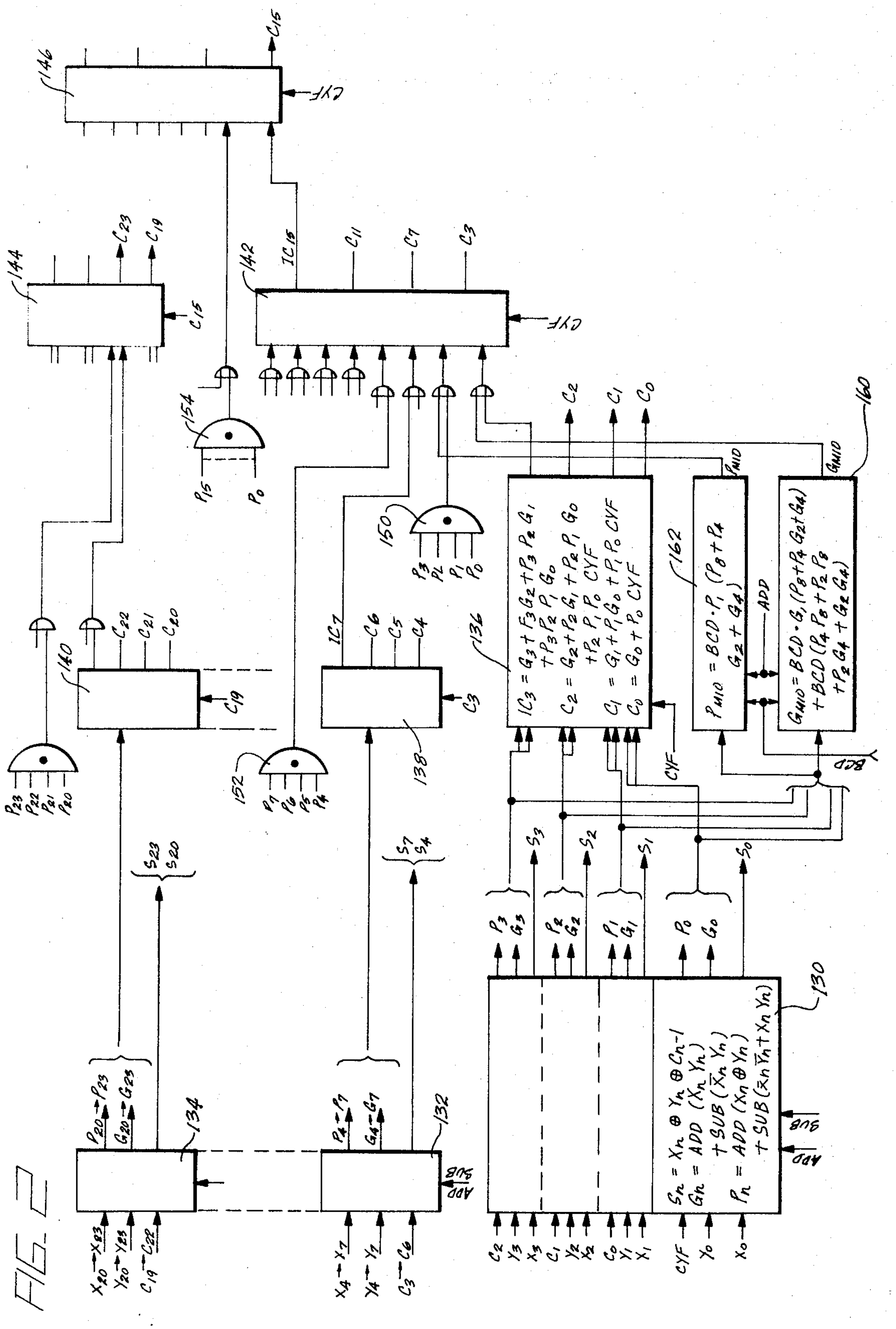
FIG. 2 is a schematic block diagram of the function generating portion of the arithmetic unit of FIG. 1.

The binary adder 114 is shown in more detail in FIG. 2. The adder is a parallel 24-bit adder with a modified "look ahead" carry logic. The adder includes six identical integrated circuit units, three of which are indicated at 130, 132, and 134, for receiving the input levels of the operands plus the carry information. Each integrated circuit unit is a 4-bit adder which receives four bits from the X-register 14, four bits from the Y-register 16, and four carry signals. Thus for the lowest order bit, the adder section receives $X_0$, $Y_0$, and the input carry designation CYF from the CP-register 22. It also receives an indication from the source control 108 whether an addition or a subtraction function is specified as the source by the Move microoperator in the M-register 30. Each bit section provides three outputs, which for the lowest order bit section correspond respectively to the binary sum $S_0$ and the propagate and generate carry signals $P_0$ and $G_0$. The circuit logic of each bit section provides the relationship between the input signals and the output signals according to the following equations:

$$S_n = X_n \oplus Y_n \oplus C_{n-1}$$
$$G_n = \text{ADD } (X_nY_n) + \text{SUB } \overline{X}_nY_n$$
$$P_n = \text{ADD } (\overline{X}_n\ Y_1 + X_n\ \overline{Y}_n) + \text{SUB } (\overline{X}_n\overline{Y}_n + X_nY_n)$$

The look ahead carry logic includes nine identical integrated circuit units, six of which are indicated at 136, 138, 140, 142, 144, and 146, respectively. These units are arranged in a pyramid with a first level having one such unit associated with each 4-bit adder unit, making six units in the first level. The second level has one such unit for each four units in the first level, making two units in the second level. The third level has one unit for each four or less units in the second level, making one unit in the third level in the 24-bit adder of FIG. 2. Each unit has nine inputs and four outputs. The units associated with the 4-bit adders have their inputs connected to the propagate and generate carry signals from each bit of the associated adder unit plus the carry from the next lower 4-bit adder, which in the case of the lowest order 4-bit adder is derived from the CYF output of the CP-register 22. Three of the outputs correspond to the carry for the three lowest order bits of the associated 4-bit adder section. The fourth output is an incomplete carry term and must be combined with other carry terms in the next level of carry logic, comprising units 142 and 144. Three of the outputs of the second level of carry logic provide the carry signals for the highest order bit in each of the associated 4-bit adder sections. The fourth output again is an incomplete carry signal and must be combined with other carry logic in a third level of binary logic provided by an identical integrated circuit unit 146. In the particular embodiment shown in which there are only six 4-bit adder sections, the third level of carry logic provides the output carry for the highest order bit in the fourth 4-bit adder unit, namely, the carry $C_{15}$.

The circuit logic of each of the integrated circuit units for the generation of the carry signals is given by the following equations:

$C_0 = G_0 + P_0 CYF$ $C_1 = G_1 + P_1 G_0 + P_1 P_0\ CYF$ $C_2 = G_2 + P_2 G_1 + P_2 P_1 G_0 + P_2 P_1 P_0\ CYF$ $IC_3 = G_3 + P_3 G_2 + P_3 P_2 G_1 + P_3 P_2 P_1 G_0$

It will be noted that the equation for the highest order bit provides an incomplete carry signal since it lacks the term $P_3 P_2 P_1 P_0\ CYF$. This term is added by the next level of logic provided by the integrated circuit unit 142 in providing the output $C_3$. This is accomplished by connecting the $IC_3$ to one input of the logic circuit unit 142 and connecting the output of a logical AND circuit 150 to the second input. Each of the four propagate carries $P_0$ through $P_3$ are applied to the input of the AND circuit 150. Thus it will be seen that by analogy with the equation for $C_0$, the equation for $C_3$ is:

$C_3 = IC_3 + P_3 P_2 P_1 P_0\ CYF$

In similar fashion the next 4-bit adder unit 132 has the propagate and generate signals applied to the inputs to the carry logic unit 138 together with the carry $C_3$ for generating the carry signals $C_4$, $C_5$, $C_6$ and the incomplete carry term $IC_7$. The latter is coupled to the third input of the second level of carry logic at 142 while the four propagate carries $P_4$ through $P_7$ are applied to an AND circuit 152 to the fourth input of the carry circuit 142. This produces the carry for the highest order bit of the second adder section, namely, $C_7$.

While not specifically shown in FIG. 2, it will be understood that these same connections are repeated for the third and fourth 4-bit binary adder units, corresponding to input bits 8 through 15 from the X and Y-registers. The carry for the highest order bit of the fourth 4-bit binary adder unit, namely, $C_{15}$, is generated by applying the $IC_{15}$ term from the second level logic section 142 to the first input of the third level carry logic section 146 together with the carry CYF and the output of a logical AND circuit 154 to which the propagate carries $P_0$ through $P_{15}$ are applied. The same pattern of connections is repeated for the fifth and sixth binary adder units corresponding to bits 16 through 23, only the highest order adder unit being shown at 134.

The adder as thus far described provides the binary sum or difference for each bit position of the input derived from the X and Y registers together with the carry or borrow for each bit position. The adder may operate on any selected number of bits starting at the least significant bit position and provides a binary sum or difference on the corresponding number of bits, with the output carry being provided by the most significant active bit position.

The 24 output bits $S_0$ through $S_{23}$ provide the binary sum/difference input to the switching circuit 110 described above. The carry signals $C_0$ through $C_{23}$ are applied to a gating circuit 156 (see FIG. 1) together with the CPL signal from the CP-register 22. Depending upon the word length specified by CPL, the carry from the highest order bit position corresponding to that word length is gated to a single output line designated CYL. For example, if CPL specifies a word length of 10 bits, then the carry line $C_9$ would be gated to the output CYL by the gating circuit 156.

To determine whether there is to be a borrow in a subtraction operation, it is only necessary to determine if X is less than Y, or if X is equal to Y and there is an input carry CYF. This is done by a comparison logic circuit 158 to which the outputs of the X-register 14, the Y-register 16, and the CYF section of the CP-register 22 are applied. A single output line, designated CYD, provides an indication if X is less than Y, or if X is equal to Y and CYF is present.

To provide a 4-bit or 8-bit binary-coded decimal addition or subtraction it is necessary to modify the carry logic in the binary adder 114 and to convert the binary sum from binary to binary-coded decimal. To this end, the CU portion of the CP-register 22, which indicates whether straight binary, 4-bit binary-coded decimal or 8-bit binary-coded decimal units are specified, is applied to the binary adder 114 and to the binary to binary-coded decimal converter 120. For 4-bit binary-coded decimal addition, it is necessary to modify the carry logic to provide a carry from the fourth bit position when the result of the addition produces a 10 or greater, or produces a 9 and an input carry CYF is present. In other words, the generate carry G must be true if the sum is equal to or greater than 10 and the propagate carry should be true if the sum is equal to 9. Thus the logic circuit for providing the modulo-10 generate carry $G_{M10}$ is provided by a logic circuit 160 to which the generate and propagate signals from each of the four sections of the 4-bit adder unit 130 are applied together with a signal BCD indicating that a binary-coded decimal operation is specified by the CU section of the CP-register 22. Logic circuit 160 provides an output according to the following logic equation:

$G_{M10} = BCD.G_1\ (P_8 + P_4 G_2 + G_4)$
$+ BCD\ (P_4 P_8 + P_2 P_8 + P_2 G_4 + G_2 G_4)$ Thus $G_{M10}$ is true if the sum of the two 4-bit inputs is equal to 10 or more.

A modulo-10 propagate carry is generated by a logic circuit 162 which receives the same inputs as the logic circuit 160. The logic circuit 162 provides an output $P_{M10}$ according to the following equation:

$P_{M10} = BCD.ADD.P_1\ (P_8 + P_4 G_2 + G_4)$

The modulo-10 generate and propagate signals $G_{M10}$ and $P_{M10}$ are ORed with the inputs to the first two positions of the second order carry logic circuit 142, thereby providing an output carry signal $C_3$ if $G_{M10}$ is true or if $P_{M10}$ and CYF are true. Thus by enabling the logic circuits 160 and 162 in response to the binary-coded decimal designation by the CU section of the CP-register 22, a carry is generated from the highest order bit position of the 4-bit adder section 142, namely, $C_3$, when the conditions for binary-coded decimal carry are satisfied. While not specifically shown in FIG. 2, the carries corresponding to the highest order bit position of each of the other 4-bit adder sections, namely, $C_7$, $C_{11}$, $C_{15}$, $C_{19}$ and $C_{23}$, are controlled by modulo-10 generate and propagate logic circuits corresponding to circuits 160 and 162.

It is also necessary to correct the pattern of binary bits for the binary conditions 10 through 15, which are forbidden combinations in a binary-coded decimal system. Thus whenever the results correspond to a binary-coded 10 through 15, the result must be modified by adding 6 to the binary result. This is done by the binary to binary-coded decimal converter circuit 120, as shown in more detail in FIG. 5. The logic circuit used for the converter, indicated at 164, is identical to the 4-bit adder circuit 130. The lowest order bit of the binary sum, namely, $S_0$, is unmodified in the code conversion. Therefore the line $S_0$ from the binary adder circuit 130 is applied directly to an AND circuit 166 together with the line BCD indicating that a binary-coded decimal conversion is required. The output of the AND circuit 166 is the lowest order bit $DS_0$ of the binary-coded decimal sum.

The output $S_1$ and the carry $C_3$ are applied to the first two lowest order bit sections of the logic circuit 164. The second lowest order bit section produces an output which is applied to an AND circuit 168 together with the BCD level to produce the binary-coded decimal bit $DS_1$. The generate carry output G of the lowest order bit section is in turn applied to the carry input C of the highest order bit section of the logic circuit 164 as is the generate carry output G of the third order bit section of the logic circuit 164. The generate carry output of the second order bit section is connected to the carry input of the third order bit section of the adder 164. The $S_2$ and $C_3$ are applied to the third order stage and $S_3$ is applied to the fourth order stage. The sum from the third order stage is coupled through an AND circuit 170 while the sum from the fourth order stage is coupled out through an AND circuit 172 to provide the decimal-coded output bits $D_s2$ and $D_s3$.

Figure 5:
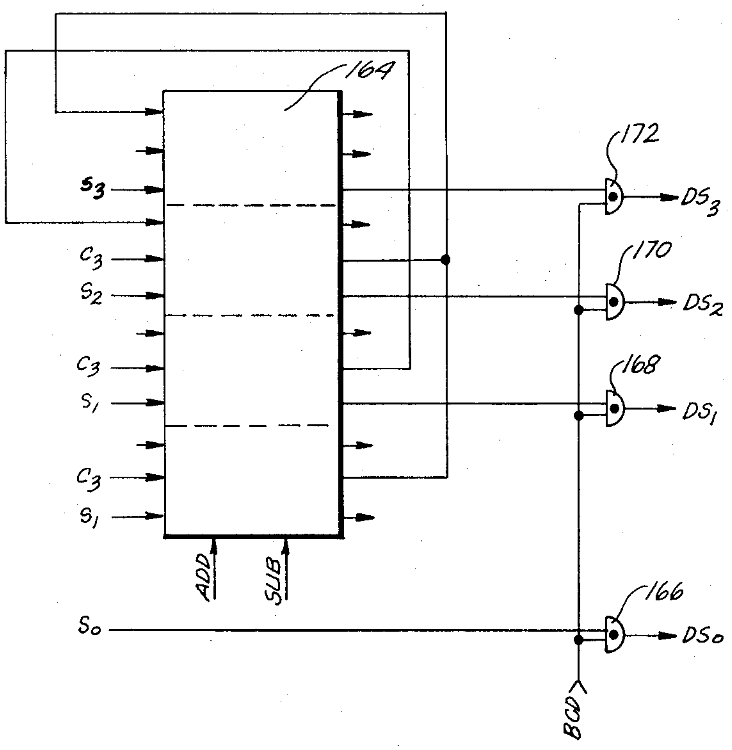
FIG. 5 is a schematic diagram of a binary to binary-coded decimal converter.

The effect of the connections shown in FIG. 5 is to provide the addition of 6 to the binary input or the subtraction of 6 from the binary input if a carry or borrow are present respectively for the highest order bit of the 4-bit binary input. A similar binary to binary-coded decimal converting circuit is provided for each of the other 4-bit binary adder sections.

For subtraction, the conditions are the same for binary and binary-coded decimal as far as the propagate and generate terms are concerned. Therefore no modification is required for subtraction to the propagate and generate signals. The modification provided by the logic circuits 160 and 162 is only required for addition.

Referring again to FIG. 1, the logic functions X·Y and X⊕Y, corresponding to inputs of the switching circuit 110, are derived respectively from the generate and propagate outputs of the 4-bit binary adder sections 130 through 134. It will be seen from the equations for the binary adder sections that the generate signal $G_n$ is equal $X_n \cdot Y_n$ for an addition. Thus the 24 output lines $G_0$ through $G_{23}$ provide the X·Y function as a source to be coupled to the data bus by the switching circuit 110. Similarly the equation for the propagate term $P_n$ is equal to $S_n \oplus Y_n$ as shown by the equations set forth above for the binary adder section. Thus the propagate outputs $P_0$ through $P_{23}$ provide the 24 bits for the X⊕Y function to the input of the gating circuit 110.

As described in more detail in the above-identified copending application, the CYF portion of the CP register 22 is set in response to the output CYL, to the output CYD, to 0, or to 1 in response to a specific microoperator in the M-register 30. This microoperator is decoded by a carry logic circuit 84 which recognizes the specific microoperator and recognizes which of the four conditions is specified by the microoperator, the carry logic circuit 84 setting the CYF portion of the CP-register 22 accordingly.

For operation on an 8-bit code in which only four of the bits are binary-coded decimal values and the other four bits are zone bits, the input to the carry logic is modified to force a 0 for each generate carry from the associated 4-bit adder and force a 1 for each propagate carry. This pushes the carry through the zone bit stages to the next higher order adder section.

From the above description it will be recognized than an arithmetic and logic circuit is provided which functions as a plurality of sources, each source in effect providing a different function of the contents of the X-register 14 and Y-register 16. A number of the sources provided by the arithmetic and logic circuit may be of variable width as specified by the contents of a Bias register. Other functions always act as a maximum width source. The arithmetic and logic circuit is capable of providing a binary sum or difference or a binary-coded decimal sum or difference for any width word up the the maximum number of parallel bits handled by the transfer path of the data bus. Decimal carry or borrow information is provided for whatever width word is specified. Merely by changing the specified word length in the CP-register 22, in the manner described in more detail in the above-identified copending application, the arithmetic and logic circuit can appear as a parallel adder before adding words of any desired width up to the maximum number of bits permitted by the registers. The output is right jusitifed so that regardless of the word length at the output, the least significant bit is always on the same output line.

What is claimed is:

1. An arithmetic and logic unit for a digital processor having variable length data comprising first and second registers for storing binary coded operands, a parallel binary adder, the contents of the first and second registers being coupled to said adder, a binary carry circuit coupled to the output of the binary adder generating a binary carry signal for each order of the parallel binary output bits of the binary adder, control register means storing information specifying the required data length, means responsive to the contents of the control register means for selectively gating bits out in parallel including the least significant bit of the binary adder output, the number of said bits in parallel corresponding to said specified data length, and means responsive to the contents of the control register means for gating out the binary carry signal corresponding to the highest order of the selected bits.

2. Apparatus as defined in claim 1 further including means for converting the output of the binary adder from a binary code to a binary coded decimal code, a binary-coded decimal carry circuit coupled to the binary adder for generating a decimal carry signal for each group of four bits of the parallel binary adder output, said control register means storing information specifying whether the contents of the first and second registers are in binary code or binary-coded decimal code, and means responsive to the contents of the control register for selectively coupling the binary output or the binary-coded decimal output to said gating means.

3. In a digital processor having a common data transfer bus for transferring a predetermined maximum number of bits in parallel, a variable word width arithmetic and logic circuit comprising first and second input registers coupled to the data bus for receiving and storing groups of bits in parallel, the number of significant bits in each register being any number up to said maximum number transferable on the data bus, a parallel binary adder means coupled to the input registers for generating at the output of the adder means the binary coded sum of the contents of the first and second input registers, storing means for storing information as to the number of significant bits starting with the least significant bit position selected to be transferred in parallel from the adder to the bus, gating means coupling the output of the adder means to the transfer bus, said gating means being responsive to the contents of the storing means for gating out bits in parallel to the transfer bus, the number of significant bits starting with the least significant bit position gated out being controlled by the contents of the storing means, and second storing means storing a carry bit, said means being coupled to the binary adder, the binary adder including carry generating means generating a carry output signal for each order of the binary sum, and gating means responsive to the contents of the first-mentioned storing means for selectively gating the carry output signal from the highest order of the specified number of bits in the binary sum to the second storing means.

4. Apparatus as defined in claim 3 further including means coupled to the first and second registers for generating in response to the contents of said registers a plurality of outputs with a different logical function on each output, and means for selectively coupling any one of the logical function outputs or the adder output to the transfer bus through said gating means.

5. Apparatus as defined in claim 3 including means for converting the output of the binary adder from a binary code to a binary coded decimal code, a binary-coded decimal carry circuit coupled to the binary adder for generating a decimal carry signal for each group of four bits of the parallel binary adder output, third storing means storing information specifying whether the contents of the first and second registers are in binary code or binary-coded decimal code, and means responsive to the contents of the third storing means for selectively coupling the binary output or the binary-coded decimal output to said gating means.

* * * * *